US009862875B2

(12) United States Patent
Nguyen et al.

(10) Patent No.: US 9,862,875 B2
(45) Date of Patent: Jan. 9, 2018

(54) DRILL-IN FLUIDS COMPRISING NANOPARTICULATES FOR CONSOLIDATING SUBTERRANEAN FORMATIONS WHILE DRILLING

(71) Applicant: Halliburton Energy Services, Inc., Houston, TX (US)

(72) Inventors: Philip D. Nguyen, Houston, TX (US); Loan K Vo, Houston, TX (US); Lee J. Hall, The Woodlands, TX (US); Dale E. Jamison, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/906,282

(22) PCT Filed: Oct. 29, 2013

(86) PCT No.: PCT/US2013/067186
§ 371 (c)(1),
(2) Date: Jan. 20, 2016

(87) PCT Pub. No.: WO2015/065324
PCT Pub. Date: May 7, 2015

(65) Prior Publication Data
US 2016/0160113 A1 Jun. 9, 2016

(51) Int. Cl.
*E21B 21/00* (2006.01)
*C09K 8/57* (2006.01)
*C09K 8/04* (2006.01)
*E21B 7/00* (2006.01)

(52) U.S. Cl.
CPC .............. *C09K 8/57* (2013.01); *C09K 8/04* (2013.01); *E21B 7/00* (2013.01); *E21B 21/00* (2013.01); *C09K 2208/10* (2013.01)

(58) Field of Classification Search
CPC ........ C09K 8/57; C09K 8/04; C09K 2208/10; E21B 21/00; C21B 7/00
USPC ........ 166/305.1, 292, 250.01, 285, 293, 284
See application file for complete search history.

(56) References Cited

U.S. PATENT DOCUMENTS

| 4,000,781 A * | 1/1977 | Knapp | C09K 8/5755 166/276 |
|---|---|---|---|
| 4,982,793 A | 1/1991 | Holtmyer et al. | |
| 5,067,565 A | 11/1991 | Holtmyer et al. | |
| 5,122,549 A | 6/1992 | Holtmyer et al. | |

(Continued)

FOREIGN PATENT DOCUMENTS

WO     2015065324 A1    5/2015

OTHER PUBLICATIONS

International Search Report and Written Opinion for PCT/US2013/067186 dated Jul. 25, 2014.

*Primary Examiner* — Silvana Runyan
(74) *Attorney, Agent, or Firm* — McDermott Will & Emery LLP

(57) ABSTRACT

Embodiments herein include methods comprising providing a drill-in fluid comprising an aqueous base fluid and nanoparticulates; providing a drilling apparatus comprising a drill string and a drill bit; circulating the drill-in fluid while drilling a reservoir interval in a subterranean formation with the drilling apparatus such that the nanoparticles penetrate into the subterranean formation; and consolidating unconsolidated particles within the subterranean formation with the nanoparticles.

18 Claims, 1 Drawing Sheet

(56) References Cited

U.S. PATENT DOCUMENTS

| | | | |
|---|---|---|---|
| 5,582,249 A * | 12/1996 | Caveny | C09K 8/5755 166/276 |
| 6,311,773 B1 | 11/2001 | Todd et al. | |
| 6,513,592 B2 | 2/2003 | Espin et al. | |
| 6,632,778 B1 | 10/2003 | Ayoub et al. | |
| 6,981,560 B2 | 1/2006 | Nguyen et al. | |
| 7,114,570 B2 | 10/2006 | Nguyen et al. | |
| 7,299,875 B2 | 11/2007 | Nguyen et al. | |
| 7,306,037 B2 | 12/2007 | Nguyen et al. | |
| 7,766,099 B2 | 8/2010 | Nguyen | |
| 7,803,347 B2 | 9/2010 | Ajiri | |
| 7,926,591 B2 | 4/2011 | Nguyen et al. | |
| 2002/0058601 A1 | 5/2002 | Jordan et al. | |
| 2003/0059742 A1 | 3/2003 | Webster et al. | |
| 2008/0070807 A1 | 3/2008 | Munoz et al. | |
| 2008/0194430 A1* | 8/2008 | Welton | C09K 8/68 507/213 |
| 2009/0020042 A1 | 1/2009 | Glende et al. | |
| 2010/0300688 A1* | 12/2010 | Panga | C09K 8/80 166/280.2 |
| 2010/0300759 A1* | 12/2010 | Passade-Boupat | C09K 8/03 175/65 |
| 2011/0036577 A1* | 2/2011 | Barmatov | C09K 8/516 166/305.1 |
| 2011/0094740 A1 | 4/2011 | Stephenson et al. | |
| 2012/0015852 A1* | 1/2012 | Quintero | C09K 8/032 507/112 |
| 2012/0309653 A1 | 12/2012 | Medvedev et al. | |
| 2013/0165353 A1* | 6/2013 | Mazyar | B82Y 30/00 507/219 |
| 2014/0238673 A1* | 8/2014 | Nguyen | E21B 43/261 166/278 |

* cited by examiner

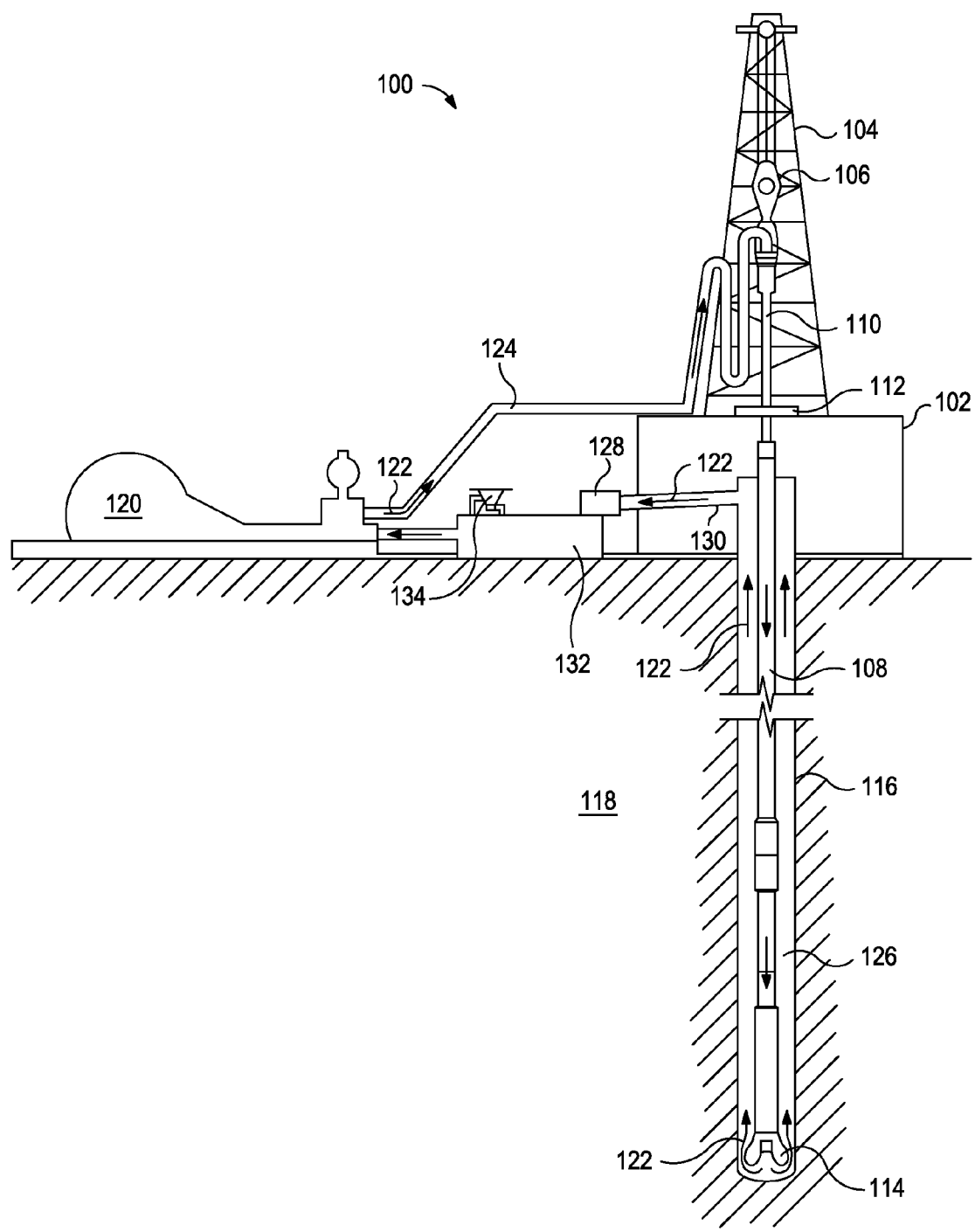

DRILL-IN FLUIDS COMPRISING NANOPARTICULATES FOR CONSOLIDATING SUBTERRANEAN FORMATIONS WHILE DRILLING

BACKGROUND

The embodiments herein relate to drill-in fluids comprising nanoparticulates for consolidating subterranean formations while drilling.

Subterranean formations, particularly hydrocarbon-producing formations, may comprise intervals that are weakly consolidated. As used herein, the term "weakly consolidated" and all variants thereof refers to one or more portions of a subterranean formation that contains loose (or unconsolidated) particulates and/or particulates having insufficient bond strength to withstand the forces created by the production (or injection) of fluids through the formation during subterranean treatment operations. These particles may include, for example, sand, clay, rock, or other particulate solids formed from the subterranean formation.

Some subterranean formations may initially comprise weakly consolidated intervals or may become so due to drilling operations, pumping operations, and other such subterranean operations that may abrade the surface of the formation and cause the formation of particulates. Such operations may additionally exacerbate the formation of particulates in an existing weakly consolidated interval.

Weakly consolidated formations may contain substantial quantities of oil and gas, but recovery of the oil and gas is often difficult due to the movement of unconsolidated particles. The creation and movement of these particulates may impose limitations on the drawdown pressure within the subterranean formation. As used herein, the term "drawdown pressure" refers to the differential pressure that drives fluids from within the wellbore to the surface. Therefore, unconsolidated particles may limit the rate at which fluids can be produced from the subterranean formation.

One approach designed to prevent the movement of unconsolidated particles in a wellbore in a subterranean formation (or to "consolidate" or "stabilize") is the use of gravel packing or frac-packing techniques. As used herein, the term "gravel packing" refers to a particulate control method in which a permeable screen is placed in a wellbore in a subterranean formation and the annulus between the screen and the formation surface is packed with gravel of a specific size designed to prevent the passage of unconsolidated particles from the subterranean formation (e.g., from a weakly consolidated interval) through the gravel pack screen, referred to as a "gravel pack." As used herein, the term "frac-packing" refers to a combined hydraulic fracturing and gravel packing treatment. In frac-packing operations, a substantially particulate-free fluid is pumped through the annulus between the permeable screen and the wellbore at a rate and pressure sufficient to create or enhance at least one fracture in the formation.

In both gravel packing and frac-packing operations, consolidation of unconsolidated particles in the subterranean formation is performed after drilling the particular interval being gravel packed or frac-packed. As such, damage to the drilling equipment and creation of additional unconsolidated particles during drilling cannot be controlled. Additionally, unconsolidated particles may still escape the confines of the gravel pack and flow into the wellbore opening, limiting well productivity.

Another technique for controlling the movement of unconsolidated particles in subterranean formations involves treating the formation with a consolidating agent to facilitate stabilization of the unconsolidated particles to prevent them from migrating from the formation. Traditional consolidating agents may be ineffective at treating long interval wellbores, as they may disproportionally aggregate in the portion of the wellbore closer to the initiation point of the wellbore. Traditional consolidating agents may additionally be difficult to handle, may be ineffectively placed into a formation, and may result in permeability damage.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

FIG. 1 depicts an embodiment of a system configured for delivering the nanoparticulates in the drill-in fluids of the embodiments described herein to a downhole location.

DETAILED DESCRIPTION

The embodiments herein relate to drill-in fluids comprising nanoparticulates for consolidating subterranean formations while drilling. Specifically, the embodiments herein relate to consolidating subterranean formation intervals, particularly weakly consolidated intervals, with nanoparticulates during drilling operations using nanoparticulates.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

Drilling operations and consolidating treatments are typically not performed simultaneously because during drilling operations, fluid loss is desirably controlled to reduce formation damage that can be caused by solids migration (e.g., consolidating agents) from the drilling fluid into the formation, resulting in reduced, and sometimes substantially reduced, permeability of the formation. As such, drilling with a traditional consolidation agent may undesirably cause damage to the formation, thereby reducing the productivity of the formation or require costly remedial operations. The nanoparticulates described in the embodiments herein are surprisingly able to be included in the drill-in fluids of the embodiments described herein, leak-off into the formation during drilling so as to penetrate into the subterranean formation and consolidate unconsolidated particles, without the traditional adverse effects of substantially reduced permeability of the formation.

In some embodiments, a method is disclosed herein of providing a drill-in fluid comprising an aqueous base fluid and nanoparticles, and providing a drilling apparatus comprising a drill string and a drill bit. The drill-in fluid is circulated while drilling a reservoir zone in a subterranean formation with the drilling apparatus. During drilling, the nanoparticulates in the drill-in fluid contact the unconsolidated particles in the subterranean formation at the reservoir zone by penetrating into the subterranean formation, and as a result provide consolidation or cohesion to the unconsolidated particles, thereby anchoring them in place. In other embodiments, after consolidating the unconsolidated particles with the nanoparticulates, as described herein, a casing string is introduced into the subterranean formation adjacent to the reservoir interval and cemented into place. In some embodiments, the cemented casing string may be perforated and the subterranean formation is hydraulically fractured, so as to permit produced fluids to flow therethrough and to the surface. As used herein, the term "drill-in fluid" refers to a fluid designed for drilling through the reservoir interval of a wellbore in a subterranean formation. As used herein, the term "reservoir interval" and all its variants refer to a portion of a subterranean formation having sufficient porosity and permeability to store and transmit fluids.

In some embodiments, where a casing string is cemented into place at the reservoir zone after consolidating the unconsolidated particles with the nanoparticulates, as described in some embodiments herein, at least a portion of the drill string may be formed of casing string. That is, the subterranean formation may be simultaneously drilled and cased (and simultaneously consolidated with nanoparticulates) because the casing string is used for a portion of the drill string.

The nanoparticulates act to consolidate unconsolidated particles in the subterranean formation by penetrating into the subterranean formation and forming stable bridge points between unconsolidated particles and the formation itself, thereby providing consolidation or cohesion between the unconsolidated particles. Drag and/or pressure forces of flowing fluids are not able to overcome the bridge points or bonds to carry the unconsolidated particles away with the flowing fluids. Moreover, the bridge points or bonds may also interact between individual or groups of nanoparticulates, thereby forming a self-assembled network of nanoparticulates. This may be particularly beneficial when the subterranean formation being consolidated is particularly large or vugular. The nanoparticulates may penetrate into the subterranean formation distances in the range of a lower limit of about 0.1 wellbore diameter ("WD"), 0.25 WD, 0.5 WD, 0.75 WD, 1 WD, 1.25 WD, 1.75 WD, 2 WD, 2.25 WD, 2.5 WD, 2.75 WD, 3 WD, 3.25 WD, 3.5 WD, and 3.75 WD, to an upper limit of about 6 WD, 6.75 WD, 6.5 WD, 6.25 WD, 6 WD, 5.75 WD, 5.5 WD, 5.25 WD, 5 WD, 4.75 WD, 4.5 WD, 4.25 WD, 4 WD, and 3.75 WD, where they may consolidate unconsolidated particles therein. In other embodiments, the nanoparticulates may penetrate into the subterranean formation distances in the range of from about 3 WD to about 6 WD.

Suitable nanoparticulates for use in the embodiments described herein may include, but are not limited to, a silk; a cellulose; a chitin; a chitosan; a starch; a polyamide; carbon silica; alumina; zirconia; a polyurethane; a polyester; a polyolefin; collagen; a polyglycolic; an alkaline earth metal oxide; an alkaline earth metal hydroxide; an alkali metal oxide; an alkali metal hydroxide; a transition metal oxide; a transition metal hydroxide; a post-transition metal oxide; a post-transition metal hydroxide; a piezoelectric crystal; a pyroelectric crystal; and any combination thereof. Suitable alkaline earth metals may be selected from the group consisting of magnesium; calcium; strontium; barium; and any combination thereof. Suitable alkali metals may be selected from the group consisting of lithium; sodium; potassium; and any combination thereof. Suitable transition metals may be selected from the group consisting of titanium; zinc; and any combination thereof. Suitable post-transition metals may be selected from the group consisting of aluminum; piezoelectric crystal; pyroelectric crystal; and combinations thereof.

The nanoparticulates may be of any shape suitable for use in subterranean formation operations in accordance with the methods of the present invention. Suitable shapes may include, but are not limited to, sphere-shaped; rod-shaped; fiber-shaped; cup-shaped; cube-shaped; truncated cube-shaped; rhombic dodecahedron-shaped; truncated rhombic-dodecahedron-shaped; oval-shaped; diamond-shaped; pyramid-shaped; polygon-shaped; torus-shaped; dendritic-shaped; astral-shaped; cylinder-shaped; irregular-shaped; triangular-shaped; bipyramid-shaped; tripod-shaped; wire-shaped; tetrahedron-shaped; cuboctahedron-shaped; octahedron-shaped; truncated octahedron-shaped; icosahedron-shaped; and any combination thereof. In some embodiments, the nanoparticulates may have a particle size in the range of from a lower limit of about 1 nanometer ("nm"), 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, and 1000 nm to an upper limit of about 2000 nm, 1950 nm, 1900 nm, 1850 nm, 1800 nm, 1750 nm, 1700 nm, 1650 nm, 1600 nm, 1550 nm, 1500 nm, 1450 nm, 1400 nm, 1350 nm, 1300 nm, 1250 nm, 1200 nm, 1150 nm, 1100 nm, 1050 nm, and 1000 nm in their longest dimension. In some embodiments, the nanoparticulates may have a particle size in the range of from about 1 to about 100 nm in their longest dimension. In other embodiments, the mean particle size of the nanoparticulates in a drill-in fluid may be less than about 100 nm in their longest dimension.

In some embodiments, the preferred shape of the nanoparticulates of the present invention is fiber-shaped or rod-shaped. Such fiber-shapes or rod-shapes may enhance the ability of the nanoparticulate to burrow into the subterranean formation during drilling, as well as provide some flexibility to adapt to different types of reservoir intervals. When the shape of the nanoparticulate is fiber-shaped or rod-shaped, for example, the size of the fiber or rod may have a diameter in the range of a lower limit of about 5 nm, 10 nm, 15 nm, 20 nm, 25 nm, 30 nm, 35 nm, 40 nm, 45 nm, 50 nm, 55 nm, and 60 nm to an upper limit of about 100 nm, 95 nm, 90 nm, 85 nm, 80 nm, 75 nm, 70 nm, 65 nm, and 60 nm, and a length in the range of about 50 nm, 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, and 1000 nm to an upper limit of about 2000 nm, 1950 nm, 1900 nm, 1850 nm, 1800 nm, 1750 nm, 1700 nm, 1650 nm, 1600 nm, 1550 nm, 1500 nm, 1450 nm, 1400 nm, 1350 nm, 1300 nm, 1250 nm, 1200 nm, 1150 nm, 1100 nm, 1050 nm, and 1000 nm. Preferably, when fiber-shaped or rod-shaped nanoparticulates are used in the embodiments described herein, they are produced from materials including, but not limited to, a silk; a cellulose; a chitin; a chitosan; a starch; a polyamide; carbon silica; alumina; zirconia; a polyurethane; a polyester; a polyolefin; collagen; a polyglycolic; or any combination thereof. However, other nanoparticulate materials may also be utilized, as disclosed herein. Generally, the nanoparticulate materials selected should be pliable or otherwise capable of deforming when encountering stress.

In some embodiments, the nanoparticulates for use in the drill-in fluids described herein may be at least partially impregnated with ions. As used herein, the term "impregnated" refers to filling, saturating, or permeating a substance into a nanoparticulate. The nanoparticulates of the present invention may be impregnated, for example, when the shape of the nanoparticulate is particularly porous or has areas of void space, such as when a self-assembled network of nanoparticulates is to be treated with the delayed tackifying agent. The ions may facilitate aggregation of the individual nanoparticulates to form a network. Suitable ions that may be used to impregnate the nanoparticulates may include, but are not limited to, a monoatomic cation; a monoatomic anion; a polyatomic cation; a polyatomic anion; and any combination thereof. Suitable examples of monoatomic cations include, but are not limited to, hydrogen; lithium; sodium; potassium; rubidium; cesium; silver; magnesium; calcium; strontium; barium; zinc; cadmium; aluminum; bismuth; and any combination thereof. Suitable examples of monoatomic anions include, but are not limited to, hydride; fluoride; chloride; bromide; iodide; oxide; sulfide; nitride; phosphide; carbide; and any combination thereof. Suitable examples of polyatomic cations include, but are not limited to, ammonium; hydronium; and any combination thereof. Suitable examples of polyatomic anions include, but are not limited to, hydroxide; cyanide; peroxide; carbonate; oxalate; nitrite; nitrate; phosphate; phosphite; sulfite; sulfate; thiosulfate; hypochlorite; chlorite; chlorate; perchlorate; acetate; arsenate; borate; silicate; permanganate; chromate; dichromate; formate; bicarbonate; bisulfite; bisulfate; hydrogen phosphate; dihydrogen phosphate; and any combination thereof. In some embodiments, the ions used to impregnate the nanoparticulates may be included in an amount in the range of a lower limit of about 0.1%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the nanoparticulates. In other embodiments, the ions used to impregnate the nanoparticulates may be included in an amount of about 1% to about 5% by weight of the nanoparticulates. In some embodiments, a chelating agent and/or a coupling agent may be used to facilitate impregnation of the ions within the nanoparticulates described herein. It is within the ability of one of ordinary skill in the art, with the benefit of this disclosure, to determine whether and how much of a chelating agent and/or coupling agent is needed to achieve the desired results.

In some embodiments, the nanoparticulates may be at least partially coated or impregnated with a delayed tackifying agent. The nanoparticulates may be coated or impregnated with the delayed tackifying agents either prior to introducing the nanoparticulates into the subterranean formation (e.g., preparing the drill-in fluid described herein prior to performing drilling operations) or "on-the-fly" at the well site. As used herein, the term "on-the-fly" refers to performing an operation during a subterranean treatment that does not require stopping normal operations. Coating or impregnating the nanoparticulates with the delayed tackifying agent may enhance grain-to-grain or grain-to-formation adherence between the individual nanoparticulates and/or the loose particles from the subterranean formation. That is, the delayed tackifying agent is capable of becoming tacky such that it acts to stabilize loose particles downhole. As used herein, the term "tacky," in all its forms, generally refers to a substance having a nature such that it is (or may be activated to become) somewhat sticky to the touch. The nanoparticulates of the present invention may be impregnated, for example, when the shape of the nanoparticulate is particularly porous or has areas of void space, such as when a self-assembled network of nanoparticulates is to be treated with the delayed tackifying agent. For example, a dendritic-shaped nanoparticulate may preferably be coated with the delayed tackifying agent only on its dendritic projections, which may impart more flexibility to a network of grain-to-grain contacted nanoparticulates.

The delayed tackifying agent may be "activated" by certain conditions within the subterranean formation or within the drill-in fluid in which the nanoparticulates are suspended, such as, for example, temperature, time, pressure, pH, salinity, and the like. The delayed tackifying agents can thus be generally inert until they reach a target interval (e.g., the reservoir interval described herein), where they will become activated to exhibit the desired tackiness to aid in controlling loose particles in the subterranean formation.

Suitable delayed tackifying agents may include, but are not limited to, a polymerizable monomer; a polymerizable oligomer; a two-component resin agent; and any combination thereof. Typically, the polymerizable monomers for use as delayed tackifying agents may contain at least one functional group including, but not limited to, a urethane; an amine; an acrylic; a carboxylic; an amide; a hydroxyl; and any combination thereof. Suitable polymerizable monomers may include, but are not limited to, monofunctional acrylates; multifunctional acrylates; monofunctional methacrylates; multifunctional methacrylates; and any combination thereof. The polymerizable oligomers suitable for use as a delayed tackifying agent may include, but are not limited to, a lignin; a lignin derivative; an aromatic urethane acrylate; an aliphatic urethane acrylate; an epoxy acrylate; a urethane acrylate; a urethane dimethacrylate; and any combination thereof. The two-component resin agents for use in the embodiments described herein may comprise a liquid hardenable resin component and a liquid hardening component. Optionally, a silane coupling agent and a surfactant may be included in the two-component resin agent to facilitate handling, mixing, and coating or impregnating of the resin agent onto the nanoparticulates. In some embodiments, the delayed tackifying agent is present in the range of a lower limit of about 0.1%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the nanoparticulates. In other embodiments, the delayed tackifying agent may be present in the range of about 1% to about 3% by weight of the nanoparticulates.

Suitable liquid hardenable resins for use in the two-component resin agent may include, but are not limited to, a bisphenol A-epichlorohydrin resin; a novolak resin; a polyepoxide resin; a phenol-aldehyde resin; a urea-aldehyde resin; a urethane resin; a phenolic resin; a furan resin; a furan/furfuryl alcohol resin; a phenolic/latex resin; a phenol formaldehyde resin; a polyester resin; a polyurethane resin; an acrylate resin; a silicon-based resin; a glycidyl ether resin; a bisphenol A-diglycidyl ether resin; a butoxymethyl butyl glycidyl ether resin; a bisphenol F resin; an epoxide resin; any hybrids thereof; any copolymers thereof; and any combination thereof. Some suitable liquid hardenable resins, such as epoxy resins, may be cured with an internal catalyst or activator so that when pumped down hole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable liquid hardenable resin for use in the two-component resin agents described herein to achieve the desired delayed activity. Generally, the liquid hardenable resin component of the two-component resin agent is present in an amount in the range from a lower limit of about 5%, 15%, 25%, 35%, 45%, and 55% to an upper limit of about 95%, 85%, 80%, 75%, 70%, 65%, 60%, and 55% by weight of the liquid hardening component. It is within the ability of one skilled in the art, with the benefit of this disclosure, to determine how much of the liquid hardenable resin component may be needed to achieve the desired results based on, for example, the type of the liquid hardenable resin component used, the type of liquid hardening component used, the conditions of the subterranean formation, the type and size of nanoparticulates used, and the like.

The liquid hardening component of the two-component resin agent described herein may include, but is not limited to, a cyclo-aliphatic amine; a piperazine, an aminoethylpiperazine; an aromatic amine; a methylene dianiline; a 4,4'-diaminodiphenyl sulfone; an aliphatic amine; an ethylene diamine; a diethylene triamine; a triethylene tetraamine; a triethylamine; a benzyldiethylamine; a N,N-dimethylaminopyridine; 2-($N_2$N-dimethylaminomethyl)phenol; tris(dimethylaminomethyl)phenol; a tetraethylene pentaamine; an imidazole; a pyrazole; a pyrazine; a pyrimidine; a pyridazine; 1H-indazole; a purine; a phthalazine; a napththyridine; a quinoxaline; a quinazoline; a phenazine; an imidazolidine; a cinnoline; an imidazoline; 1,3,5-triazine; a thiazole; a pteridine; an indazole; an amine; a polyamine; an amide; a polyamide; 2-ethyl-4-methyl imidazole; any derivative thereof; and any combination thereof. The liquid hardening component of the two-component resin agents may be included in an amount sufficient to at least partially harden the liquid hardenable resin component. In some embodiments, the liquid hardening component may be present in an amount in the range of a lower limit of about 0.1%, 1%, 10%, 20%, 30%, 40%, and 50% to an upper limit of about 95%, 90%, 80%, 70%, 60%, and 50% by weight of the liquid hardenable resin component. In other embodiments, the liquid hardening component may be present in an amount in the range of about 15% to about 85% by weight of the liquid hardenable resin component. In other embodiments, the liquid hardening component may be present in the range of about 15% to about 55% by weight of the liquid hardenable resin component.

Optionally, in some embodiments where a two-component resin agent is used as the delayed tackifying agent, a silane coupling agent and/or a surfactant may be included to facilitate the coating and bonding of the two-component resin agent onto or within (e.g., impregnation) the nanoparticulates described herein. Examples of suitable silane coupling agents include, but are not limited to, N-2-(aminoethyl)-3-aminopropyltrimethoxysilane; 3-glycidoxypropyltrimethoxysilane; and any combination thereof. The silane coupling agent may be included in the liquid hardenable resin component or the liquid hardening component (according to the chemistry of the particular group as determined by one skilled in the art with the benefit of this disclosure). In some embodiments, the silane coupling agent used is included in the liquid hardenable resin component in the range of a lower limit of about 0.1%, 0.2%, 0.3%, 0.4%, 0.5%, 0.6%, 0.7%, 0.8%, 0.9%, 1%, 1.1%, 1.2%, 1.3%, 1.4%, and 1.5% to about 3%, 2.9%, 2.8%, 2.7%, 2.6%, 2.5%, 2.4%, 2.3%, 2.2%, 2.1%, 2%, 1.9%, 1.8%, 1.7%, 1.6%, and 1.5% by weight of the liquid hardening component.

Any surfactant compatible with the liquid hardening component and capable of facilitating the coating of the liquid hardenable resin onto the nanoparticulates described herein may be used in the liquid hardenable resin component. Such surfactants may include, but are not limited to, an alkyl phosphonate surfactant (e.g., a C12-C22 alkyl phosphonate surfactant); an ethoxylated nonyl phenol phosphate ester; one or more cationic surfactants; one or more nonionic surfactants; and any combination thereof. The surfactant or surfactants that may be used in the embodiments described herein may be present in the liquid hardenable resin component in an amount in the range of a lower limit of about 1%, 1.25%, 1.75%, 2%, 2.25%, 2.5%, 2.75%, 3%, 3.25%, 3.5%, 3.75%, 4%, 4.25%, 4.5%, 4.75%, 5%, 5.5%, and 5.75% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, and 5.75% by weight of the liquid hardening component.

The drill-in fluids of the embodiments described herein comprise an aqueous base fluid. Suitable aqueous base fluids may include, but are not limited to, fresh water; saltwater (e.g., water containing one or more salts dissolved therein); brine (e.g., saturated salt water); seawater; and any combinations thereof. Generally, the water may be from any source, provided that it does not contain components that might adversely affect the stability and/or performance of the drill-in fluids of the present invention. In certain embodiments, the density of the aqueous base fluid can be adjusted, among other purposes, to enhance solids transport and suspension. In these embodiments, the pH may be adjusted to a specific level, which may depend on, among other factors, the types of additives included in the drill-in fluid. In some embodiments, the pH range may preferably be from about 4 to about 11. One of ordinary skill in the art, with the benefit of this disclosure, will recognize the type of aqueous base fluid to use in the fluids of the present invention and when density and/or pH adjustments are appropriate.

In some embodiments, the drill-in fluids described herein may further comprise a water-soluble polymer; a foaming agent; a gas; a viscoelastic surfactant; a weighting agent; and any combination thereof.

The water-soluble polymer may increase the viscosity of the drill-in fluids, which, among other things, may enhance the suspension capacity of the nanoparticulates in the drill-in fluids. Suitable water-soluble polymers for use in the present invention include, but are not limited to, gelling agents. Suitable gelling agents for use as a water-soluble polymer described in some embodiments herein may comprise any substance (e.g., a polymeric material) capable of increasing the viscosity of the drill-in disclosed herein. The gelling agents may be naturally-occurring gelling agents; synthetic gelling agents; or a combination thereof. The gelling agents also may be cationic gelling agents; anionic gelling agents; or a combination thereof. Suitable gelling agents include, but are not limited to, polysaccharides; starches; biopolymers; derivatives thereof; derivatives thereof that contain one or more of these monosaccharide units: galactose, mannose, glucoside, glucose, xylose, arabinose, fructose, glucuronic acid, or pyranosyl sulfate; and any combination thereof. Examples of biopolymers include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")); cellulose derivatives (e.g., hydroxyethyl cellulose, carboxyethylcellulose, carboxymethylcellulose, and carboxymethylhydroxyethylcellulose); xanthan; scleroglucan; succinoglycan; diutan; and any combination thereof.

Suitable synthetic polymers include, but are not limited to, 2,2'-azobis(2,4-dimethyl valeronitrile); 2,2'-azobis(2,4-dimethyl-4-methoxy valeronitrile); polymers and copolymers of acrylamide ethyltrimethyl ammonium chloride; acrylamide; acrylamido-alkyl trialkyl ammonium salt; methacrylamido-alkyl trialkyl ammonium salt; acrylamidomethylpropane sulfonic acid; acrylamidopropyl trimethyl ammonium chloride; acrylic acid; dimethylaminoethyl methacrylamide; dimethylaminoethyl methacrylate; dimethylaminopropyl methacrylamide; dimethyldiallylammonium chloride; dimethylethyl acrylate; fumaramide; methacrylamide; methacrylamidopropyl trimethyl ammonium chloride; methacrylamidopropyldimethyl-n-dodecylammonium chloride; methacrylamidopropyldimethyl-n-octylammonium chloride; methacrylamidopropyltrimethylammonium chloride; methacryloylalkyl trialkyl ammonium salt; methacryloylethyl trimethyl ammonium chloride; methacrylylamidopropyldimethylcetylammonium chloride; N-(3-sulfopropyl)-N-methacrylamidopropyl-N,N-dimethyl ammonium betaine; N,N-dimethylacrylamide; N-methylacrylamide; nonylphenoxypoly(ethyleneoxy)ethylmethacrylate; partially hydrolyzed polyacrylamide; poly 2-amino-2-methyl propane sulfonic acid; polyvinyl alcohol; sodium 2-acrylamido-2-methylpropane sulfonate; quaternized dimethylaminoethylacrylate; quaternized dimethylaminoethylmethacrylate; any derivative thereof; and any combination thereof. In certain embodiments, the gelling agent may comprise an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

In those embodiments in which a gelling agent is used as the water-soluble polymer, the gelling agent may be present in the drill-in fluids in an amount sufficient to provide the desired viscosity. In some embodiments, the gelling agents (i.e., the water-soluble polymer) may be present in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25% 6%, 5.75%, 5.5%, 5.25%, and 5% by weight of the drill-in fluid. In certain embodiments, the gelling agents may be present in an amount in the range of from about 0.15% to about 2.5% by weight of the drill-in fluid.

The drill-in fluids described herein may further be foamed by inclusion of a gas and a foaming agent. As used herein, the term "foam" refers to a two-phase composition comprising having a continuous liquid phase and a discontinuous gas phase. Suitable gases for use in the drill-in fluids described herein may include, but are not limited to, nitrogen; carbon dioxide; air; methane; helium; argon; and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen.

In some embodiments, the gas may be present such that the drill-in fluid exhibits a foam quality in the range from a lower limit of about 5%, 10%, 25%, 40%, 50%, 60%, or 70% gas volume to an upper limit of about 95%, 90%, 80%, 75%, 60%, or 50% gas volume, and wherein the foam quality of the drill-in fluid may range from any lower limit to any upper limit and encompass any subset therebetween. Most preferably, the drill-in fluid may have a foam quality from about 85% to about 95%, or about 90% to about 95%.

Suitable foaming agents for use in the drill-in fluids described herein may include, but are not limited to, cationic foaming agents; anionic foaming agents; amphoteric foaming agents; nonionic foaming agents; or any combination thereof. Nonlimiting examples of suitable foaming agents may include, but are not limited to, surfactants like betaines; sulfated alkoxylates; sulfonated alkoxylates; alkyl quarternary amines; alkoxylated linear alcohols; alkyl sulfonates; alkyl aryl sulfonates; C10-C20 alkyldiphenyl ether sulfonates; polyethylene glycols; ethers of alkylated phenol; sodium dodecylsulfate; alpha olefin sulfonates (e.g., sodium dodecane sulfonate, trimethyl hexadecyl ammonium bromide, and the like); any derivative thereof; or any combination thereof. Foaming agents may be included in drill-in fluids at concentrations ranging typically from about 0.05%, 0.06%, 0.07%, 0.08%, 0.09%, 0.1%, 0.2%, 0.3%, 0.4%, 0.5%, 0.6%, 0.7%, and 0.8% to an upper limit of about 2%, 1.9%, 1.8%, 1.7%, 1.6%, 1.5%, 1.4%, 1.3%, 1.2%, 1.1%, 1%, 0.9%, and 0.8% by weight of the liquid component of the drill-in fluid (e.g., from about 0.5 to about 20 gallons per 1000 gallons of liquid).

In some embodiments, the drill-in fluids of the present invention may comprise a viscoelastic surfactant. The viscoelastic surfactants may generally comprise any viscoelastic surfactant known in the art, or any combination thereof. As used herein, the term "viscoelastic surfactant" refers to surfactants that impart or are capable of imparting viscoelastic behavior to a fluid due, at least in part, to the association of surfactant molecules to form viscosifying micelles. As used herein, the term "viscosifying micelle" includes structures that minimize the contact between the lyophobic ("solvent-repelling") portion of a surfactant molecule and the solvent that, under certain conditions (e.g., concentration, ionic strength of the fluid, etc.) are capable of, inter alia, imparting increased viscosity to a particular fluid and/or forming a gel.

The viscoelastic surfactants for use in the drill-in fluids described herein may be cationic; anionic; nonionic; amphoteric; zwitterionic or any combination thereof. The viscoelastic surfactants may comprise any number of different compounds, including, but not limited to, a methyl ester sulfonate; a hydrolyzed keratin; and any combination thereof. Still other useful viscoelastic surfactants may include, but are not limited to, a sulfosuccinate; a taurate; an amine oxide; an ethoxylated amide; an alkoxylated fatty acid; an alkoxylated alcohol (e.g., lauryl alcohol ethoxylate, ethoxylated nonyl phenol); an ethoxylated fatty amine; an ethoxylated alkyl amine (e.g., cocoalkylamine ethoxylate); a betaine; modified betaine; an alkylamidobetaine (e.g., cocoamidopropyl betaine); a quaternary ammonium compound (e.g., trimethyltallowammonium chloride, trimethylcocoammonium chloride); an alkyl sulfate; an alkyl ether sulfate; an alkyl sulfonate; an ethoxylated ester; an ethoxylated glycoside ester; an alcohol ether; any derivative thereof; and any combination thereof. As used herein, the term "derivative" is defined herein any compound that is made from one of the listed compounds, for example, by replacing one atom in one of the listed compounds with another atom or group of atoms, ionizing one of the listed compounds, or creating a salt of one of the listed compounds.

The viscoelastic surfactant may be present in the drill-in fluids described herein such that they are viscosified in an amount sufficient to impart the desired viscosity (e.g., to suspend particulates, etc.) to the fluid. In certain embodiments, the viscoelastic surfactant may be present in the drill-in fluid in an amount in the range of from a lower limit of about 0.1%, 0.25%, 0.5%, 0.75%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the drill-in fluid. In certain embodiments, the viscoelastic surfactant may be present in an amount in the range of from about 1% to about 10% by weight of the drill-in fluid. In certain embodiments, the viscoelastic surfactant may be present in an amount of about 7% by weight of the drill-in fluid.

Weighting agents may be included in the drill-in fluids to, for example, increase the fluid density and thereby affect the hydrostatic pressure exerted by the drill-in fluid. Suitable weighting agents for use in the drill-in fluids may include, but are not limited to, calcium carbonate; manganese carbonate; zinc carbonate; potassium chloride; sodium chloride; sodium bromide; calcium chloride; calcium bromide; ammonium chloride; zinc bromide; zinc formate; zinc oxide; barium sulfate; lead(II) sulfide; an acid soluble material; and any combination thereof. The acid soluble material may be fully soluble in acid or only partially soluble in acid. In some embodiments, the weighting agent may be in the range of a lower limit of about 100 µm, 150 µm, 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, and 1000 µm to an upper limit of about 2000 µm, 1950 µm, 1900 µm, 1850 µm, 1800 µm, 1750 µm, 1700 µm, 1650 µm, 1600 µm, 1550 µm, 1500 µm, 1450 µm, 1400 µm, 1350 µm, 1300 µm, 1250 µm, 1200 µm, 1150 µm, 1100 µm, 1050 µm, and 1000 µm. The weighting agent may be present in the drill-in fluids in any amount sufficient to achieve the desired fluid density and hydrostatic pressure. In some embodiments, the weighting agent may be present in an amount ranging from a lower limit of about 0.1%, 0.5%, 1%, 2%, 3%, 4%, 5%, 6%, 7%, 8%, 9%, and 10% to an upper limit of about 20%, 19%, 18%, 17%, 16%, 15%, 14%, 13%, 12%, 11%, and 10% by weight of the liquid component of the drill-in fluid. In other embodiments, the weighting agent may be present in an amount ranging from about 1% to about 10% by weight of the liquid component of the drill-in fluid.

In some embodiments, the drill-in fluids described herein may further comprise an additive selected from the group consisting of a salt; an emulsifier; a dispersion aid; a corrosion inhibitor; an emulsion thinner; an emulsion thickener; a surfactant; a pH control additive; a breaker; a biocide; a stabilizer; a scale inhibitor; a friction reducer; a clay stabilizing agent; and any combination thereof.

The exemplary drill-in fluids comprising nanoparticulates disclosed herein may directly or indirectly affect one or more components or pieces of equipment associated with the preparation, delivery, recapture, recycling, reuse, and/or disposal of the disclosed drill-in fluids. For example, and with reference to FIG. 1, the disclosed drill-in fluids comprising nanoparticulates may directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drill-in fluid 122 through a feed pipe 124 and to the kelly 110, which conveys the drill-in fluid 122 downhole through the interior of the drill string 108 and through one or more orifices in the drill bit 114. The drill-in fluid 122 is then circulated back to the surface via an annulus 126 defined between the drill string 108 and the walls of the wellbore 116. At the surface, the recirculated or spent drill-in fluid 122 exits the annulus 126 and may be conveyed to one or more fluid processing unit(s) 128 via an interconnecting flow line 130. After passing through the fluid processing unit(s) 128, a "cleaned" drill-in fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed nanoparticulates may be added to the drill-in fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed nanoparticulates may be added to the drill-in fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed nanoparticulates may be stored, reconditioned, and/or regulated until added to the drill-in fluid 122.

As mentioned above, the disclosed drill-in fluids comprising nanoparticulates may directly or indirectly affect the components and equipment of the drilling assembly 100. For example, the disclosed drill-in fluids comprising nanoparticulates may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, and the like. The fluid processing unit(s) 128 may further include one or more sensors, gauges, pumps, compressors, and the like used store, monitor, regulate, and/or recondition the exemplary drill-in fluids comprising nanoparticulates.

The disclosed drill-in fluids comprising nanoparticulates may directly or indirectly affect the pump 120, which representatively includes any conduits, pipelines, trucks, tubulars, and/or pipes used to fluidically convey the drill-in fluids comprising nanoparticulates downhole, any pumps, compressors, or motors (e.g., topside or downhole) used to drive the drill-in fluids comprising nanoparticulates into motion, any valves or related joints used to regulate the pressure or flow rate of the drill-in fluids comprising nanoparticulates, and any sensors (i.e., pressure, temperature, flow rate, etc.), gauges, and/or combinations thereof, and the like. The disclosed drill-in fluids comprising nanoparticulates may also directly or indirectly affect the mixing hopper 134 and the retention pit 132 and their assorted variations.

The disclosed drill-in fluids comprising nanoparticulates may also directly or indirectly affect the various downhole equipment and tools that may come into contact with the drill-in fluids comprising nanoparticulates such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drill-in fluids comprising nanoparticulates may also directly or indirectly affect any downhole heat exchangers, valves and corresponding actuation devices, tool seals, packers and other wellbore isolation devices or components, and the like associated with the wellbore 116. The disclosed drill-in fluids comprising nanoparticulates may also directly or indirectly affect the drill bit 114, which may include, but is not limited to, roller cone bits, PDC bits, natural diamond bits, any hole openers, reamers, coring bits, etc.

While not specifically illustrated herein, the disclosed drill-in fluids comprising nanoparticulates may also directly or indirectly affect any transport or delivery equipment used to convey the drill-in fluids comprising nanoparticulates to the drilling assembly 100 such as, for example, any transport vessels, conduits, pipelines, trucks, tubulars, and/or pipes used to fluidically move the drill-in fluids comprising nanoparticulates from one location to another, any pumps, compressors, or motors used to drive the drill-in fluids comprising nanoparticulates into motion, any valves or related joints used to regulate the pressure or flow rate of the drill-in fluids comprising nanoparticulates, and any sensors (i.e., pressure and temperature), gauges, and/or combinations thereof, and the like.

Embodiments disclosed herein include:

A. A method comprising: providing a drill-in fluid comprising an aqueous base fluid and nanoparticulates; providing a drilling apparatus comprising a drill string and a drill bit; circulating the drill-in fluid while drilling a reservoir interval in a subterranean formation with the drilling apparatus such that the nanoparticles penetrate into the subterranean formation; and consolidating unconsolidated particles within the subterranean formation with the nanoparticles.

B. A method comprising: providing a drill-in fluid comprising an aqueous base fluid and nanoparticulates; providing a drilling apparatus comprising a drill string and a drill bit; circulating the drill-in fluid while drilling a reservoir interval in a subterranean formation with the drilling apparatus; consolidating unconsolidated particles within the subterranean formation with the nanoparticles; placing a casing string adjacent to the reservoir interval; and cementing the casing string.

Each of embodiments A and B may have one or more of the following additional elements in any combination:

Element 1: Wherein the nanoparticulates are formed from a material selected from the group consisting of a silk; a cellulose; a chitin; a chitosan; a starch; a polyamide; carbon silica; alumina; zirconia; a polyurethane; a polyester; a polyolefin; collagen; a polyglycolide; an alkaline earth metal oxide; an alkaline earth metal hydroxide; an alkali metal oxide; an alkali metal hydroxide; a transition metal oxide; a transition metal hydroxide; a post-transition metal oxide; a post-transition metal hydroxide; a piezoelectric crystal; a pyroelectric crystal; and any combination thereof.

Element 2: Wherein the nanoparticulates have a shape selected from the group consisting of sphere-shaped; rod-shaped; fiber-shaped; cup-shaped; cube-shaped; truncated cube-shaped; rhombic dodecahedron-shaped; truncated rhombic-dodecahedron-shaped; oval-shaped; diamond-shaped; pyramid-shaped; polygon-shaped; torus-shaped; dendritic-shaped; astral-shaped; cylinder-shaped; irregular-shaped; triangular-shaped; bipyramid-shaped; tripod-shaped; wire-shaped; tetrahedron-shaped; cuboctahedron-shaped; octahedron-shaped; truncated octahedron-shaped; icosahedron-shaped; and any combination thereof.

Element 3: Wherein the nanoparticulates are selected from the group consisting of fiber-shaped, rod-shaped, and any combination thereof and have a diameter in the range of about 5 to about 100 nanometers, and a length in the range of about 50 to 2000 nanometers.

Element 4: Wherein the nanoparticulates have a size in the range from about 1 to about 2000 nanometers in their longest dimension.

Element 5: Wherein the nanoparticulates are at least partially coated or impregnated with a delayed tackifying agent.

Element 6: Wherein the nanoparticulates are at least partially impregnated with an ion selected from the group consisting of a monoatomic cation; a monoatomic anion; a polyatomic cation; a polyatomic anion; and any combination thereof.

Element 7: Wherein the nanoparticulates penetrate into the subterranean formation in the range of between about 0.1 to about 6 wellbore diameters.

Element 8: Wherein the drill-in fluid further comprises at least one selected from the group consisting of a water-soluble polymer; a foaming agent; a gas; a viscoelastic surfactant; a weighting agent; and any combination thereof.

Element 9: Wherein at least a portion of the drill string comprises the casing string.

Element 10: Wherein the method further comprises perforating the casing string and fracturing the subterranean formation at the reservoir interval.

Element 11: Wherein the drill-in fluid further comprises at least one selected from the group consisting of a water-soluble polymer; a foaming agent; a gas; a viscoelastic surfactant; a weighting agent; and any combination thereof.

By way of non-limiting example, exemplary combinations applicable to A and B include: A with 1, 4, and 11; A with 2 and 8; B with 3, 9, and 10; and B with 5 and 6.

Therefore, the embodiments herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a drill-in fluid comprising an aqueous base fluid, a weighting agent and nanoparticulates, the nanoparticulates at least partially impregnated or coated with a delayed tackifying agent;
wherein the delayed tackifying agent is selected from a polymerizable monomer;
a polymerizable oligomer; a two-component resin agent; and any combination thereof;
providing a drilling apparatus comprising a drill string and a drill bit;
circulating the drill-in fluid while drilling a reservoir interval in a subterranean formation with the drilling apparatus such that the nanoparticles penetrate into the subterranean formation; and
consolidating unconsolidated particles to form cohesive consolidated particles with stable bridge points between particles which are not overcome by flowing fluids within the subterranean formation with the nanoparticles.

2. The method of claim 1, wherein the nanoparticulates are formed from a material selected from the group consisting of a silk; a cellulose; a chitin; a chitosan; a starch; a polyamide; carbon silica; alumina; zirconia; a polyurethane; a polyester; a polyolefin; collagen; a polyglycolide; an alkaline earth metal oxide; an alkaline earth metal hydroxide; an alkali metal oxide; an alkali metal hydroxide; a transition metal oxide; a transition metal hydroxide; a post-transition metal oxide; a post-transition metal hydroxide; a piezoelectric crystal; a pyroelectric crystal; and any combination thereof.

3. The method of claim 1, wherein the nanoparticulates have a shape selected from the group consisting of sphere-shaped; rod-shaped; fiber-shaped; cup-shaped; cube-shaped; truncated cube-shaped; rhombic dodecahedron-shaped; truncated rhombic-dodecahedron-shaped; oval-shaped; diamond-shaped; pyramid-shaped; polygon-shaped; torus-shaped; dendritic-shaped; astral-shaped; cylinder-shaped; irregular-shaped; triangular-shaped; bipyramid-shaped; tripod-shaped; wire-shaped; tetrahedron-shaped; cuboctahedron-shaped; octahedron-shaped; truncated octahedron-shaped; icosahedron-shaped; and any combination thereof.

4. The method of claim 3, wherein the nanoparticulates are selected from the group consisting of fiber-shaped, rod-shaped, and any combination thereof and have a diameter in the range of about 5 to about 100 nanometers, and a length in the range of about 50 to 2000 nanometers.

5. The method of claim 1, wherein the nanoparticulates have a size in the range from about 1 to about 2000 nanometers in their longest dimension.

6. The method of claim 1, wherein the nanoparticulates are at least partially impregnated with an ion selected from the group consisting of a monoatomic cation; a monoatomic anion; a polyatomic cation; a polyatomic anion; and any combination thereof.

7. The method of claim 1, wherein the nanoparticulates penetrate into the subterranean formation in the range of between about 0.1 to about 6 wellbore diameters.

8. The method of claim 1, wherein the drill-in fluid further comprises at least one selected from the group consisting of a water-soluble polymer; a foaming agent; a gas; a viscoelastic surfactant; a weighting agent; and any combination thereof.

9. A method comprising:
providing a drill-in fluid comprising an aqueous base fluid, a weighting agent and nanoparticulates, the nanoparticulates at least partially impregnated or coated with a delayed tackifying agent;
wherein the delayed tackifying agent is selected from a polymerizable monomer;
a polymerizable oligomer; a two-component resin agent; and any combination thereof;
providing a drilling apparatus comprising a drill string and a drill bit;
circulating the drill-in fluid while drilling a reservoir interval in a subterranean formation with the drilling apparatus;
consolidating unconsolidated particles to form cohesive consolidated particles with stable bridge points between particles which are not overcome by flowing fluids within the subterranean formation with the nanoparticles;

placing a casing string adjacent to the reservoir interval; and cementing the casing string.

10. The method of claim 9, wherein at least a portion of the drill string comprises the casing string.

11. The method of claim 9, further comprising perforating the casing string and fracturing the subterranean formation at the reservoir interval.

12. The method of claim 9, wherein the nanoparticulates are formed from a material selected from the group consisting of a silk; a cellulose; a chitin; a chitosan; a starch; a polyamide; carbon silica; alumina; zirconia; a polyurethane; a polyester; a polyolefin; collagen; a polyglycolide; an alkaline earth metal oxide; an alkaline earth metal hydroxide; an alkali metal oxide; an alkali metal hydroxide; a transition metal oxide; a transition metal hydroxide; a post-transition metal oxide; a post-transition metal hydroxide; a piezoelectric crystal; a pyroelectric crystal; and any combination thereof.

13. The method of claim 9, wherein the nanoparticulates have a shape selected from the group consisting of sphere-shaped; rod-shaped; fiber-shaped; cup-shaped; cube-shaped; truncated cube-shaped; rhombic dodecahedron-shaped; truncated rhombic-dodecahedron-shaped; oval-shaped; diamond-shaped; pyramid-shaped; polygon-shaped; torus-shaped; dendritic-shaped; astral-shaped; cylinder-shaped; irregular-shaped; triangular-shaped; bipyramid-shaped; tripod-shaped; wire-shaped; tetrahedron-shaped; cuboctahedron-shaped; octahedron-shaped; truncated octahedron-shaped; icosahedron-shaped; and any combination thereof.

14. The method of claim 13, wherein the nanoparticulates are selected from the group consisting of fiber-shaped, rod-shaped, and any combination thereof and have a diameter in the range of about 5 to about 100 nanometers, and a length in the range of about 50 to 2000 nanometers.

15. The method of claim 9, wherein the nanoparticulates have a size in the range from about 1 to about 2000 nanometers in their longest dimension.

16. The method of claim 9, wherein the nanoparticulates are at least partially impregnated with an ion selected from the group consisting of a monoatomic cation; a monoatomic anion; a polyatomic cation; a polyatomic anion; and any combination thereof.

17. The method of claim 9, wherein the drill-in fluid further comprises at least one selected from the group consisting of a water-soluble polymer; a foaming agent; a gas; a viscoelastic surfactant; a weighting agent; and any combination thereof.

18. The method of claim 9, wherein the nanoparticulates penetrate into the subterranean formation in the range of between about 0.1 to about 6 wellbore diameters.

* * * * *